(12) United States Patent
Zilberberg (10) Patent No.: US 8,850,505 B2
(45) Date of Patent: Sep. 30, 2014

(54) SYSTEM FOR REDUCING NOISE IN A CATV HOME AMPLIFIER UPSTREAM PATH AND A METHOD THEREOF

(76) Inventor: David Zilberberg, Herut (IL)

( * ) Notice: Subject to any disclaimer, the term of this patent is extended or adjusted under 35 U.S.C. 154(b) by 0 days.

(21) Appl. No.: 13/144,210

(22) PCT Filed: Apr. 6, 2010

(86) PCT No.: PCT/IL2010/000293
§ 371 (c)(1),
(2), (4) Date: Jul. 12, 2011

(87) PCT Pub. No.: WO2010/113166
PCT Pub. Date: Oct. 7, 2010

(65) Prior Publication Data
US 2011/0267143 A1     Nov. 3, 2011

Related U.S. Application Data

(60) Provisional application No. 61/211,732, filed on Apr. 1, 2009.

(51) Int. Cl.
*H04N 7/173* (2011.01)
*H04N 5/00* (2011.01)
*H04N 7/10* (2006.01)
*H04N 21/61* (2011.01)

(52) U.S. Cl.
CPC ........... *H04N 7/102* (2013.01); *H04N 7/17309* (2013.01); *H04N 21/6168* (2013.01)
USPC ............................ 725/124; 725/127; 348/621

(58) Field of Classification Search
CPC .................................................. H04N 21/6168
USPC ................... 725/124, 119; 370/226; 343/835; 455/114.3; 348/621
See application file for complete search history.

(56) References Cited

U.S. PATENT DOCUMENTS 4,107,736 A * 8/1978 Lowry et al. .................. 348/621
4,612,571 A    9/1986 Moon
(Continued)

FOREIGN PATENT DOCUMENTS

GB         2316590 A    2/1998

OTHER PUBLICATIONS

International Search Report and Written Opinion of the ISA for PCT/IL2010/000293, ISA/EP, Rijswijk, NL, mailed Aug. 31, 2010.
(Continued)

*Primary Examiner* — Mulugeta Mengesha
*Assistant Examiner* — Tariq Gbond
(74) *Attorney, Agent, or Firm* — Harness Dickey & Pierce PLC (57) ABSTRACT

A system for control of noise in a cable TV upstream path of a bi-directional cable TV home amplifier system that is positioned in the premises of the end user includes a noise control circuit and a coupler element that couples between the noise control circuit and the cable TV upstream path. The system further includes an amplifier part that is disposed on the upstream path. The noise control circuit connects or disconnects the cable TV upstream path depending on the level of signal passing through the cable TV upstream path. Namely, when the level of a signal that passes through the upstream path is lower than a predefined signal threshold, the noise control circuit disconnects the upstream path, and when the level of the signal is greater than a predefined signal threshold, the noise control circuit connects the upstream path.

13 Claims, 9 Drawing Sheets

(56) References Cited

U.S. PATENT DOCUMENTS

| | | | |
|---|---|---|---|
| 4,894,825 A * | 1/1990 | Kobayashi et al. | 370/226 |
| 5,199,048 A | 3/1993 | Wakabayashi | |
| 5,225,902 A | 7/1993 | McMullan, Jr. | |
| 5,606,725 A | 2/1997 | Hart | |
| 5,742,591 A | 4/1998 | Himayat et al. | |
| 5,835,844 A | 11/1998 | Stoneback et al. | |
| 5,881,362 A | 3/1999 | Eldering et al. | |
| 5,881,363 A | 3/1999 | Ghosh et al. | |
| 5,893,024 A | 4/1999 | Sanders et al. | |
| 5,937,330 A | 8/1999 | Vince et al. | |
| H1858 H | 9/2000 | Ibelings | |
| 6,321,384 B1 | 11/2001 | Eldering | |
| 6,647,070 B1 | 11/2003 | Shalvi et al. | |
| 6,757,910 B1 | 6/2004 | Bianu | |
| 6,868,552 B1 | 3/2005 | Masuda et al. | |
| 2002/0010881 A1 * | 1/2002 | White | 714/44 |
| 2002/0089491 A1 * | 7/2002 | Willig | 345/173 |
| 2006/0267735 A1 * | 11/2006 | Ovard et al. | 340/10.4 |
| 2008/0062058 A1 * | 3/2008 | Bishop | 343/835 |
| 2009/0007210 A1 * | 1/2009 | Nishide et al. | 725/125 |
| 2009/0020000 A1 * | 1/2009 | Onozawa | 84/723 |
| 2010/0048150 A1 * | 2/2010 | Hwang | 455/114.3 |
| 2010/0251323 A1 * | 9/2010 | Jackson | 725/127 |
| 2011/0074337 A1 * | 3/2011 | Adachi | 320/101 |

OTHER PUBLICATIONS

Applicant's Response to the Written Opinion of the ISA (Statement Under Article 19), mailed Oct. 28, 2010.

International Preliminary Report on Patentability (Chapter I of the Patent Cooperation Treaty) for PCT/IL2010/000293, issued Oct. 4, 2011.

* cited by examiner

SYSTEM FOR REDUCING NOISE IN A CATV HOME AMPLIFIER UPSTREAM PATH AND A METHOD THEREOF

CROSS-REFERENCE TO RELATED APPLICATIONS

This application is a 371 U.S. National Stage of International Application No. PCT/IL2010/000293, filed Apr. 6, 2010. This application claims the benefit of U.S. Provisional Application No. 61/211,732, filed Apr. 1, 2009. The disclosures of the above applications are incorporated herein by reference.

FIELD OF THE INVENTION

The present invention relates to systems and methods for signal noise reduction in comprehensive information networks. More specifically, the present invention relates to a system for reducing noise in a CATV home amplifier upstream path and a method thereof.

BACKGROUND OF THE INVENTION

Cable modem technology is used in a widespread manner throughout the world. In general, the demand for CATV bandwidth and types of signals transmitted on CATV is increasing. Two-way CATV networks have been touted as a promising method of providing communications in cable television systems. However, technical problems have reduced performances of such two-way networks. In particular, interference due to ingress signals has greatly affected the quality of return path (upstream path) communications in two-way networks. Return path communications are communications from the subscribers to the head end facility.

Ingress signals comprise RF noise signals that are generated by sources external to the CATV network and are radiated onto the CATV network through cable faults, terminations, and the like. Some sources of ingress include international short-wave broadcasts; citizens band and ham radio transmissions; television receivers; computers; neon signs, electrical motors, hair dryers, garbage disposals, and other household appliances, and it has been estimated that 95% of ingress signal power originates in subscribers' homes.

Ingress signals are particularly troublesome in the context of return path communications because of the CATV two-way network structural design. In a CATV network, a large number of subscriber generated signals are funneled toward the head end. The ingress signal power on each of the subscriber generated signals is therefore combined and amplified, resulting in a relatively high ingress signal power at the head end facility.

Several approaches known in the art for signal noise reduction in electrical systems are provided herein.

U.S. Pat. No. 5,881,363 describes a method and apparatus for ingress cancellation using a precoding approach at a transmitter combined with filtering at a receiver for improving upstream transmission efficiency.

U.S. Pat. No. 5,881,362 describes a method of reducing noise and ingress in cable return paths by locating blocking filters between the drop cable and home coaxial wiring.

Other prior art references which use filtering means for reducing noise in CATV systems include U.S. Pat. No. 5,937, 330, U.S. Pat. No. 6,757,910, U.S. Pat. No. 5,937,330, U.S. Pat. No. 6,321,384, U.S. Pat. No. 4,612,571, and U.S. Pat. No. 6,647,070.

Additional approaches used for reducing noise in CATV systems are disclosed herein.

U.S. Pat. No. 5,881,363 describes a method and apparatus for combating ingress and multi-path in a CATV return channel by using a pre-coder in the transmitter of user equipment and an ingress rejection filter in the receiver of head end equipment.

U.S. Pat. No. 5,199,048 describes a noise canceller for use in a CATV converter which includes a keying pulse processing circuit for removing a noise signal from a keying signal.

U.S. Pat. No. 5,225,902 describes a method for automatically selecting optimum frequencies for transmitting data from remote terminals upstream to a system manager.

U.S. Pat. No. 5,606,725 describes a broadband network with an upstream power transmission level that is dynamically adjusted as a function of the bit error rate.

U.S. Pat. No. 5,742,591 discloses an interference cancellation system for CATV return transmissions. The interference cancellation system reduces the presence of undesirable narrowband interference that corrupts return signal transmissions.

U.S. Pat. No. 5,835,844 describes a gain variance and ingress reduction system which reduces the overall ingress of interferers for an entire CATV system.

US Statutory Invention Registration No. H1858 describes a system intended for use in a cable network which includes a radio frequency (RF) sensing switch for enabling the reverse path when return signals from the remote receiver locations coupled to at least one tap are present and for disabling the reverse path when no return signals from the remote receiver locations coupled to at least one tap are present.

As noted above, various systems and methods are available nowadays for reducing noise in CATV systems. However, these systems and methods are disadvantageous due to their possessing at least one of the following drawbacks: (1) reduction in the level of the returning signal due to inclusions of splitters, filters, and switches, (2) noise compounding from the many subscribers as these systems are intended for use in cable networks (noise reduction may not be as effective as the number of subscribers increases) (3) relatively high cost of fairly complicated systems which provide a limited noise reduction of up to about 70%, and (4) relatively high cost of somewhat complicated microprocessor based systems.

Thus, the system and method of the present invention is advantageous over the above-mentioned systems and methods by achieving a fairly high percentage (approximately 90%) of noise reduction (due to the closeness of the system to the noise point sources, the noise reduction is highly effective), by its relatively low cost, as it is implemented on an existing amplifier and does not require the inclusion of a separate ingress detection unit. Additionally, unlike the above-mentioned systems, the present system does not require technical skill for installation and may be implemented on a home network either by a technician or by the customer himself.

BRIEF SUMMARY OF THE INVENTION

There is thus provided, in accordance with embodiments of the present invention, a system for control of noise in a cable TV upstream path of a bi-directional cable TV home amplifier system that is positioned in the premises of the end user. The system comprises a noise control circuit and a coupler element that couples between the noise control circuit and the cable TV upstream path. The system further includes an amplifier part which is disposed on the upstream path. The noise control circuit connects or disconnects said cable TV upstream path depending on the level of signal passing through the cable TV upstream path. In accordance with embodiments of the present invention, when the level of a signal that passes through the upstream path is lower than a predefined signal threshold, the noise control circuit disconnects the upstream path, and when the level of the signal is greater than a predefined signal threshold, the noise control circuit connects said upstream path.

Furthermore, in accordance with embodiments of the present invention, the upstream path is connected/disconnected via supplying/blocking voltage to the upstream amplifier part depending on the level of the upstream signal.

Furthermore, in accordance with embodiments of the present invention, the system further comprises an RF switching chip that is disposed before or after the upstream amplifier part, the RF switching chip connects or disconnects the upstream path depending on the level of the upstream signal.

Furthermore, in accordance with embodiments of the present invention, the system achieves about 90% noise reduction.

Furthermore, in accordance with embodiments of the present invention, the system provides about 35 dB ingress isolation.

Furthermore, in accordance with embodiments of the present invention, the noise control circuit comprises at least one comparator.

Furthermore, in accordance with embodiments of the present invention, there is provided a system for control of noise in a cable TV upstream path of a bi-directional cable TV home amplifier system that is disposed on a cable network. The system comprises a noise control circuit and a coupler element that couples between the noise control circuit and the cable TV upstream path. The system further includes an amplifier part that is disposed on the upstream path. In accordance with embodiments of the present invention, the noise control circuit connects or disconnects the cable TV upstream path depending on the level of signal passing through the cable TV upstream path. When the level of a signal that passes through the upstream path is lower than a predefined signal threshold, the noise control circuit disconnects the upstream path, and when the level of the signal is greater than a predefined signal threshold, the noise control circuit connects the upstream path.

Furthermore, in accordance with embodiments of the present invention, the cable TV drop home amplifier is combined with a passive network device.

Furthermore, in accordance with embodiments of the present invention, the passive network device is one of indoor and outdoor splitters.

Furthermore, in accordance with embodiments of the present invention, there is thus provided a method for controlling noise in a cable TV upstream path of a bi-directional cable TV home amplifier system that is positioned in the premises of the end user. The method comprises the following steps: providing a noise control circuit and providing a coupler element that couples between the noise control circuit and the cable TV upstream path. The method further comprises providing an amplifier part disposed on the upstream path. The noise control circuit connects or disconnects the cable TV upstream path depending on the level of signal passing through said cable TV upstream path. In accordance with embodiments of the present invention, when the level of a signal that passes through the upstream path is lower than a predefined signal threshold, the noise control circuit disconnects the upstream path, and when the level of the signal is greater than a predefined signal threshold, the noise control circuit connects the upstream path.

Furthermore, in accordance with embodiments of the present invention, the method further comprises supplying/blocking voltage to the upstream amplifier part depending on the level of the upstream signal.

Furthermore, in accordance with embodiments of the present invention, the method further comprises providing an RF switching chip disposed before or after the upstream amplifier part, the RF switching chip connects or disconnects the upstream path depending on the level of the upstream signal.

Furthermore, in accordance with embodiments of the present invention, the method further comprises implementing the noise control circuit and the cable TV upstream path to a typical cable network CATV splitter/coupler system.

Furthermore, in accordance with embodiments of the present invention, the method provides about 90% noise reduction.

Furthermore, in accordance with embodiments of the present invention, the methods allows up to 35 dB ingress isolation.

Furthermore, in accordance with embodiments of the present invention, the method comprises using at least one comparator.

Furthermore, in accordance with embodiments of the present invention, there is further provided a method for controlling noise in a cable TV upstream path of a bi-directional cable TV home amplifier system that is disposed on a cable network. The method comprises the following steps: providing a noise control circuit and providing a coupler element that couples between the noise control circuit and the cable TV upstream path. The method further comprises providing an amplifier part that is disposed on the upstream path. In accordance to embodiments of the present invention, the noise control circuit connects or disconnects the cable TV upstream path depending on the level of signal passing through said cable TV upstream path. In accordance with embodiments of the present invention, when the level of a signal that passes through the upstream path is lower than a predefined signal threshold, the noise control circuit disconnects the upstream path, and when the level of said signal is greater than a predefined signal threshold, the noise control circuit connects the upstream path.

Furthermore, in accordance with embodiments of the present invention, the method comprises combining the bi-directional cable TV drop home amplifier with a passive network device which may be one of indoor and outdoor splitters.

Furthermore, in accordance with embodiments of the present invention, the upstream path is one of an active path or a passive path.

DETAILED DESCRIPTION OF THE INVENTION

As mentioned earlier, comprehensive information networks are characterized as 2-way transmission systems having information flow to the head-ends via terminal interchanges and relays.

Transmission from head-end to terminal is "Forward" or "Downstream" and terminal to head-end is "Return" or "Upstream". A signal going downstream is a point-to-interface "broadcasting", and is split; signals going upstream are interface-to-point converged. Either "broadcasting" or "converging" are conducted by splitters.

In the upstream path, upstream signals are converged with noise coming from various paths. Eventually, all noises are funneled to the head-end, the so called "Funnel Effect". However, some of the noise components may have a high enough energy to mask the upstream signal, thus, may seriously affect the quality of the "Upstream" transmission.

Such noise components mostly come from terminals such as a cable modem where the commonly used amplifiers are one of the major noise generators.

Cable modems are not continuously transmitting to upstream path. Thus, if the path of the amplifier may be disconnected at times when the cable modem stops working, the noise coming from the subscriber premises may be significantly reduced, and so too the "Funnel Effect".

In addition to solving the "Funnel effect", the system and method of the present invention has the following advantages. Firstly, the system is capable of achieving about 90% noise reduction and provides up to 35 dB ingress isolation. Secondly the system's operating system is based on the burst nature of the upstream path and is capable of solving and blocking all ingress noise coming from customers' premises. Thirdly, the system does not require RF disconnections during the installation. Fourthly, the proposed system involves relatively low costs since (a) it is implemented on an existing amplifier such as, for instance, bi-directional cable TV drop (home) amplifier which requires a voltage input as low as 8-24$V_{DC}$ and does not require the addition of an ingress detection system, and (b) it may be implemented on a home network either by a technician or by the customer himself. Fifthly, the system reduces power consumption. The power consumption of amplifiers in the upstream path accounts for 60% of the total power consumption in 2-way transmission systems. If the upstream path is disconnected when the cable modem is not working, energy consumption may be reduced by more than 50%. For instance, about 20 kw-h may be saved yearly if the proposed system is used.

Figure 1:
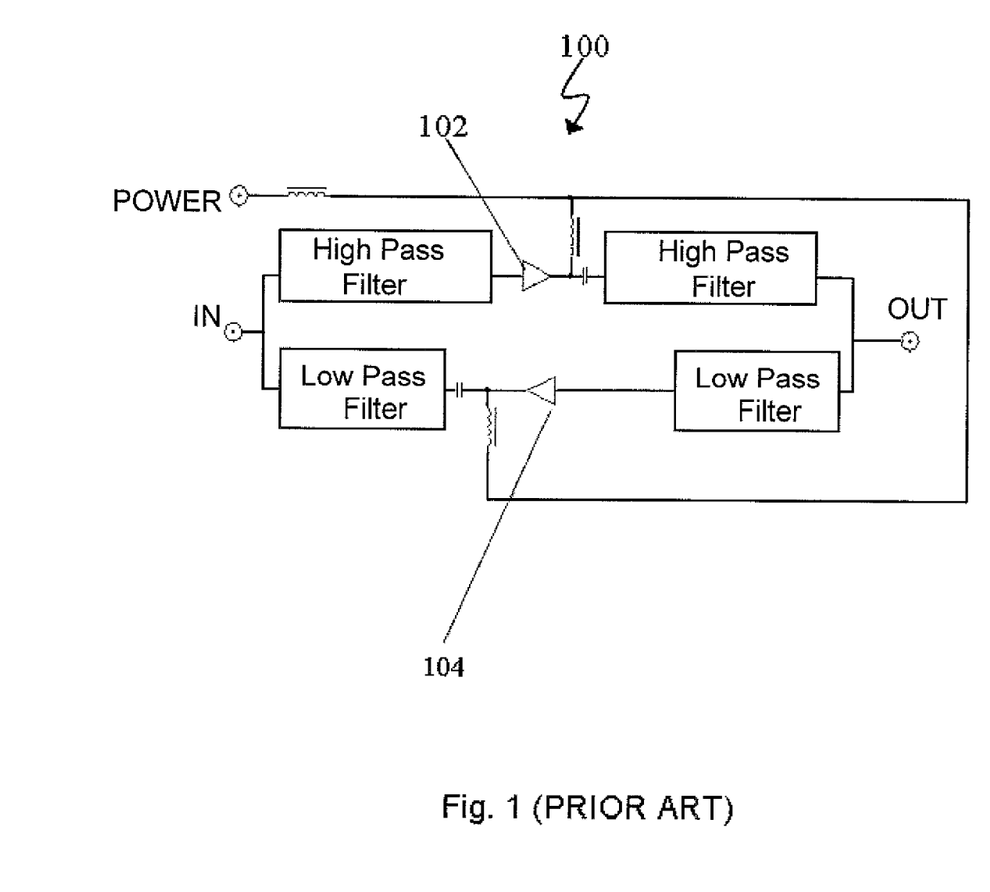
FIG. 1 (PRIOR ART) is a block diagram illustration of a typical two-way amplifier circuit.

Referring now to FIG. 1 (PRIOR ART) which is a block diagram illustration of a typical two-way amplifier circuit. In this circuit, both amplifiers, i.e., amplifier 102 and amplifier 104 are always active.

Figure 2:
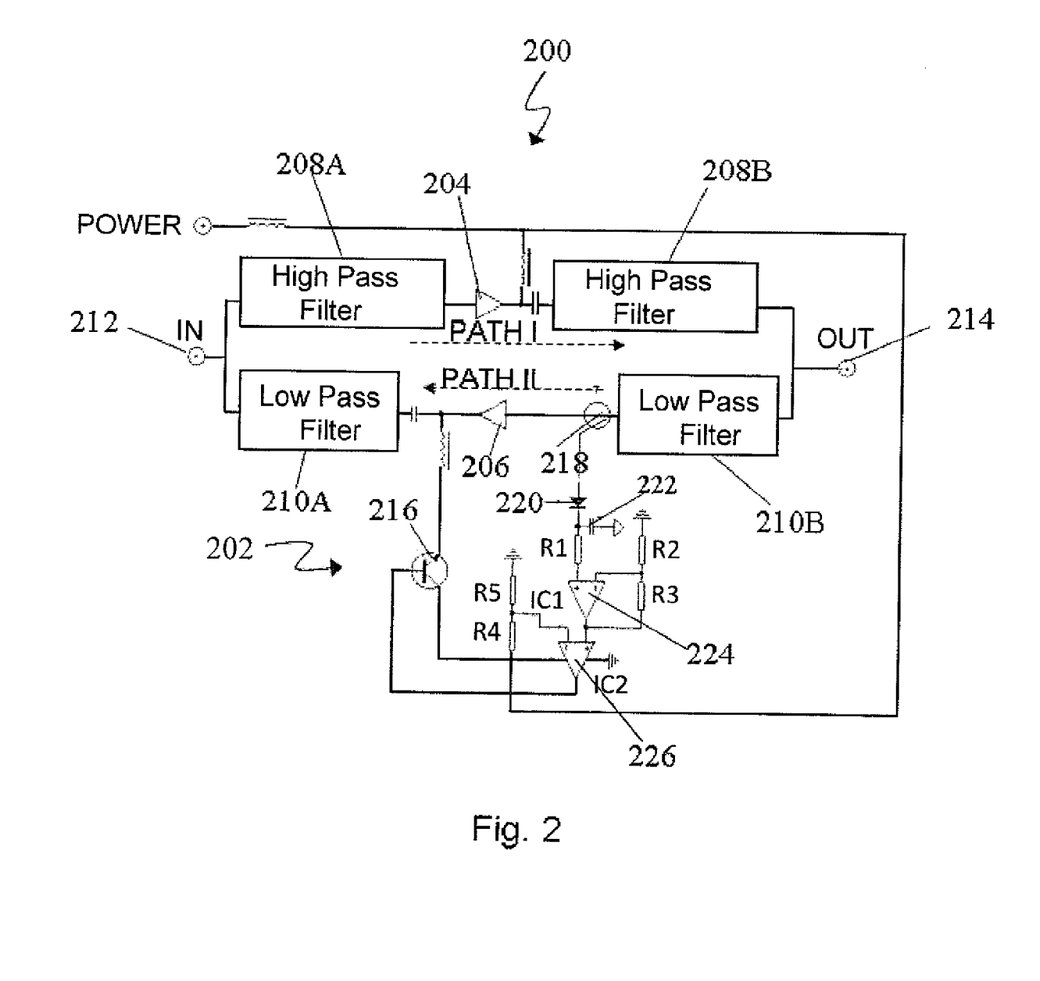
FIG. 2 is a block diagram illustration of a new bi-directional cable TV drop (home) amplifier circuit with a noise control circuit in accordance with a first embodiment of the present invention.

Referring now to FIG. 2 which is a block diagram illustration of a new bi-directional cable TV drop (home) amplifier circuit 200 with a noise control circuit 202 in accordance with a first embodiment of the present invention. As seen in FIG. 2, new bi-directional cable TV drop (home) amplifier circuit 200 comprises a downstream amplifier part 204 along forward PATH I and an upstream amplifier part 206 along upstream PATH II depicted by corresponding arrow lines. PATH I and PATH II are isolated by High Pass Filter (HPF) 208A & B and by Low Path Filter (LPF) 210A & B respectively.

Downstream signals enter at the IN port 212, pass through HPF 208A get amplified in downstream amplifier part 204, pass through HPF 208B and exit through OUT port 214. Similarly, upstream signals enter at the OUT port 214, pass through LPF 210B get amplified in upstream amplifier part 206, pass through LPF 210A and exit through IN port 212.

Noise control circuit 202 comprises an electronic switch 216 to connect/disconnect PATH II via supplying/blocking voltage to the upstream amplifier part 206 part when the level of an upstream signal (coming from customer premises) is above/below a predefined threshold such as for, instance, 80 dBµV@ on an un-modulation signal.

Noise control circuit 202 further comprises a directional coupler 218 along PATH II, diode 220, capacitor 222, comparator 224, comparator 226 and resistors 228-236. Thus, sample signals come out from directional coupler 218, pass through diode 220, form a signal voltage at capacitor 222, get amplified by comparator 224, and enter into comparator 226.

Thus, when upstream signals passing through PATH II with a signal level greater than a predefined threshold, comparer 226 turns out high voltage and electronic switch 216 connects PATH II. Thus, PATH II is power-fed and amplified upstream signals are transmitted to head-end, i.e., to IN port 212. In this case, the performance of new bi-directional cable TV drop (home) amplifier circuit 200 is the same as of the typical two-way amplifier as illustrated in FIG. 1. However, when the level of an upstream signal passing through PATH II is lower than the predefined signal threshold, comparer 226 outputs relatively low voltage, and switch 216 disconnects PATH II. While PATH II is disconnected, the noise which continuously flows through PATH II decreases significantly.

Figure 3:
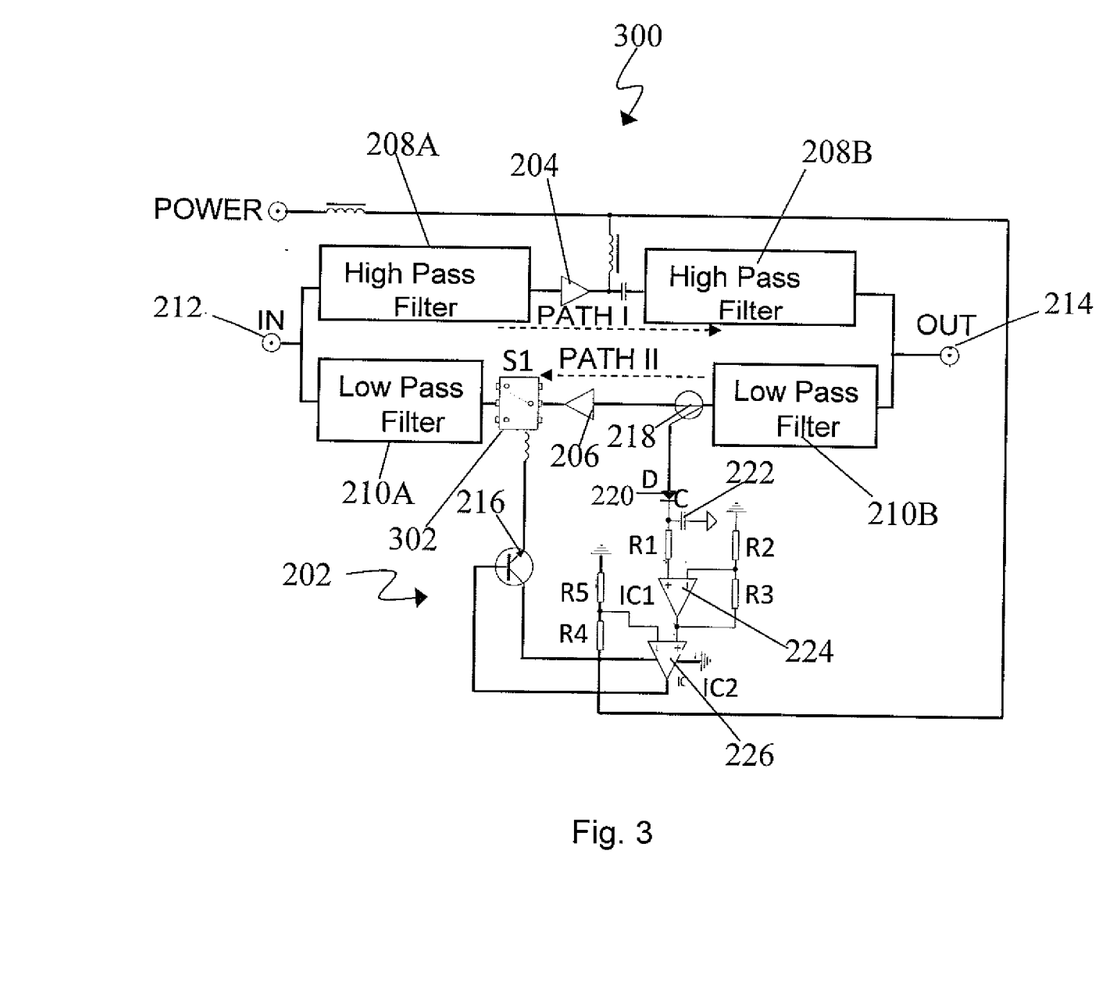
FIG. 3 is a block diagram illustration of a new bi-directional cable TV drop (home) amplifier circuit with a noise control circuit in accordance with a second embodiment of the present invention.

Referring now to FIG. 3, which is a block diagram illustration of a new bi-directional cable TV drop (home) amplifier circuit 300 with a noise control circuit in accordance with a second embodiment of the present invention. As seen in FIG. 3, new bi-directional cable TV drop (home) amplifier circuit 300 further includes fast RF switching chip 302. In this case, electronic switch 216 is permanently connected, thus upstream amplifier part 206 is always connected. It is the RF switching chip 302 that controls the switching, i.e., either connecting or disconnecting PATH II depending on the level of the upstream signal. Namely, when the level of an upstream signal passing through PATH II is lower than a predefined threshold, RF switching chip 302 disconnects PATH II, thus, decreasing the noise continuously passing through this path.

It should be noted that fast RF switching chip 302 may be positioned either before or after amplifier part 206.

It should be noted that new bi-directional cable TV drop (home) amplifier circuit 300 may not be as energy efficient as new bi-directional cable TV drop (home) amplifier circuit 200 of FIG. 2 since in this circuit, the amplifier is always active regardless of whether PATH II is connected or not.

Thus, the electricity intake of the system is greater than that of the system of FIG. 2. The advantage of new bi-directional cable TV drop (home) amplifier circuit 300 over new bi-directional cable TV drop (home) amplifier circuit 200, however, is in providing faster responses. More specifically, the time delay associated with connecting/disconnecting PATH II in two-way CATV home-type amplifier circuit 300 is less than the time delay of bi-directional cable TV drop (home) amplifier circuit 200.

Figure 4:
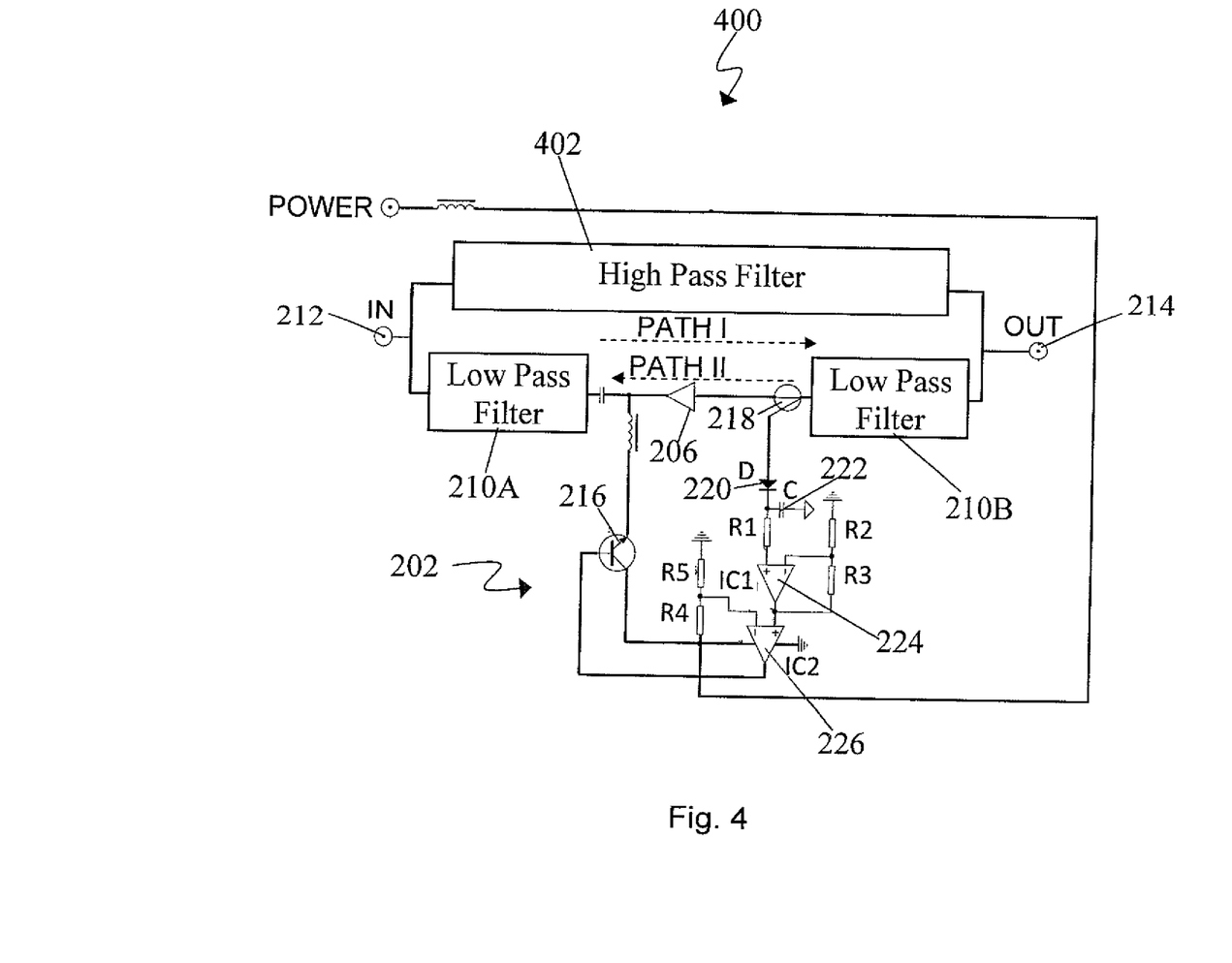
FIG. 4 is a block diagram illustration of a new bi-directional cable TV drop (home) amplifier circuit with a noise control circuit in accordance with a third embodiment of the present invention.

Referring now to FIG. 4 which is a block diagram illustration of a new bi-directional cable TV drop (home) amplifier circuit 400 with a noise control circuit in accordance with a third embodiment of the present invention.

Seen in FIG. 4, a new bi-directional cable TV drop (home) amplifier circuit 400 comprises High Pass Filter (HPF) 402 and Low Path Filter (LPF) 210 A&B. New bi-directional cable TV drop (home) amplifier circuit 400 further comprises an upstream amplifier part 206 along upstream PATH II. In this case, there is no amplifier included along PATH I, thus, downstream signals do not get amplified while passing through.

Figure 5:
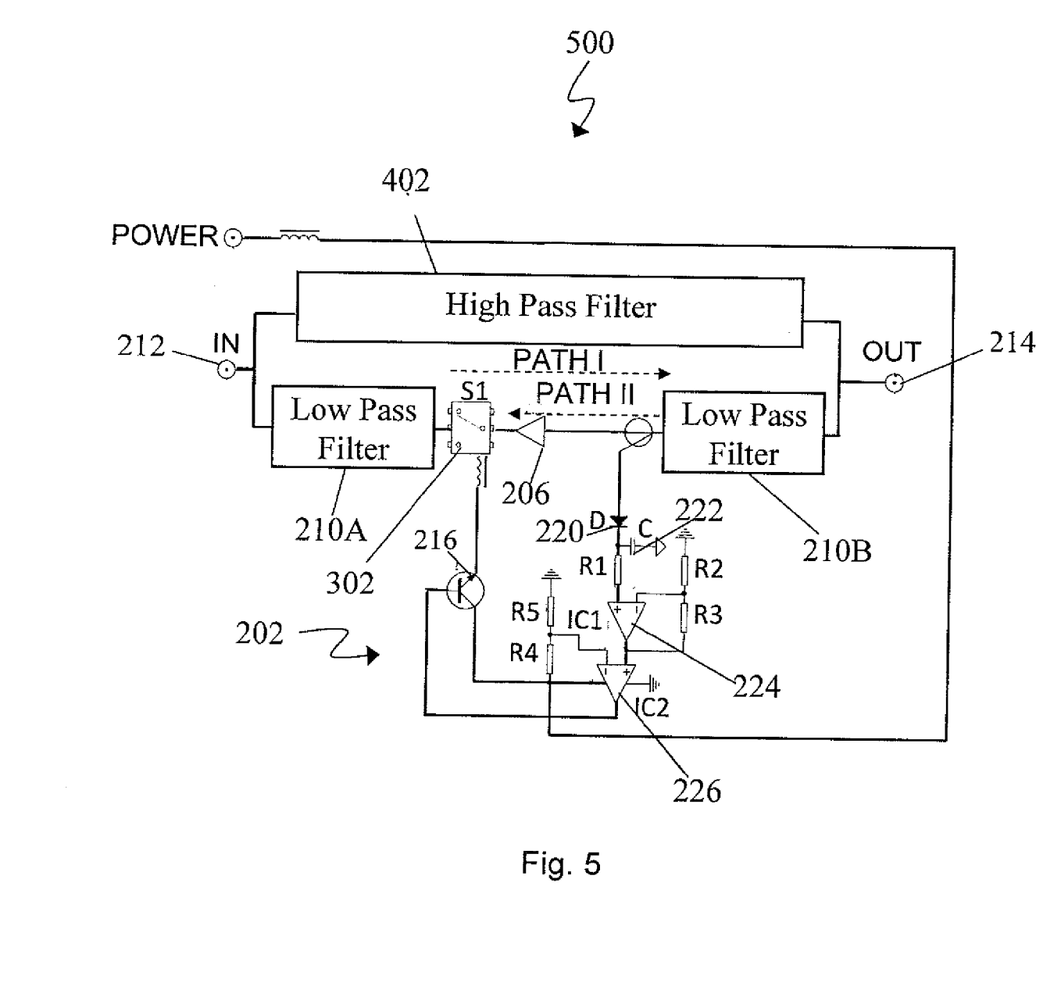
FIG. 5 is a block diagram illustration of a new bi-directional cable TV drop (home) amplifier circuit with a noise control circuit in accordance with a forth embodiment of the present invention.

Referring now to FIG. 5, which is a block diagram illustration of a new bi-directional cable TV drop (home) amplifier circuit 500 with a noise control circuit in accordance with a fourth embodiment of the present invention. Seen in the figure, new bi-directional cable TV drop (home) amplifier circuit 500 is similar to new bi-directional cable TV drop (home) amplifier circuit 400 in that the circuit includes an upstream amplifier part 206 only along PATH II. That means that downstream signals are passive, i.e., do not get amplified while passing through PATH I. In addition, new bi-directional cable TV drop (home) amplifier circuit 500 comprises RF switching chip 302 which controls the switching and either connects or disconnects PATH II depending on the level of the upstream signal. Namely, when the level of an upstream signal passing through PATH II is lower than a predefined threshold, RF switching chip 302 disconnects PATH II, thus, decreasing the noise continuously passing through this path.

It should be understood that the new bi-directional cable TV drop (home) amplifier circuit with a noise control circuit in accordance with embodiments of the present invention may be used in cable networks as well.

Figure 6A:
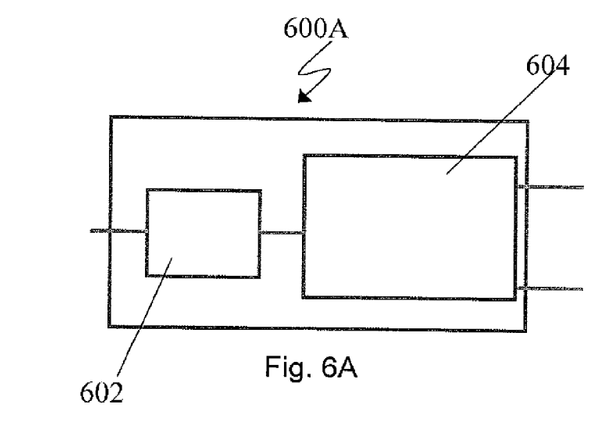
FIGS. 6A-C illustrate 3 possible implementation schemes of bi-directional cable TV drop (home) amplifier circuits with noise control circuit systems to typical outdoor CATV splitter/coupler systems.
Figure 6B:
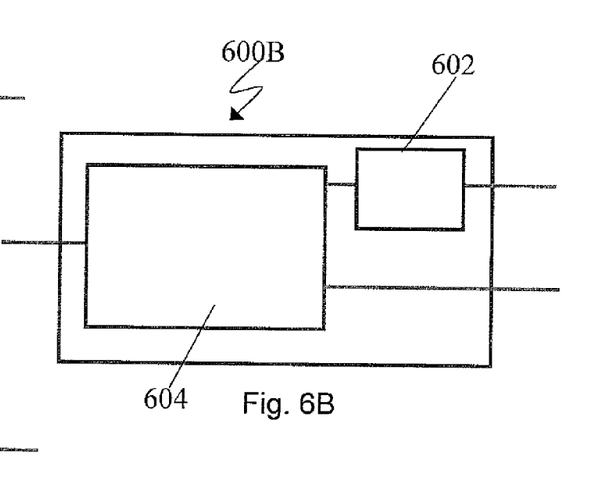
Figure 6C:
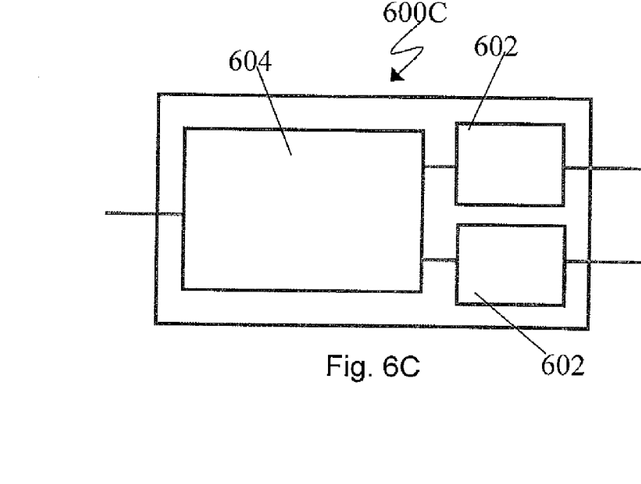

Referring now to FIGS. 6A-C which illustrate 3 possible implementation schemes of a bi-directional cable TV drop (home) amplifier circuit with noise control circuit systems to a typical outdoor CATV splitter/coupler system.

In FIG. 6A, a bi-directional cable TV drop (home) amplifier circuit with noise control circuit 602 is connected to the inlet of outdoor/indoor CATV splitter/coupler 604. In FIG. 6B, a bi-directional cable TV drop (home) amplifier circuit with noise control circuit 602 is connected to one of two outlets of outdoor/indoor CATV splitter/coupler 604. In FIG. 6c, a bi-directional cable TV drop (home) amplifier circuit 602 is connected to each of the outlets of inlet of outdoor/indoor CATV splitter/couple 604.

Such configurations enable adding a noise control circuit to typical CATV splitters/coupler without the need to install additional ingress detection units at outdoor network plant.

Figure 7A:
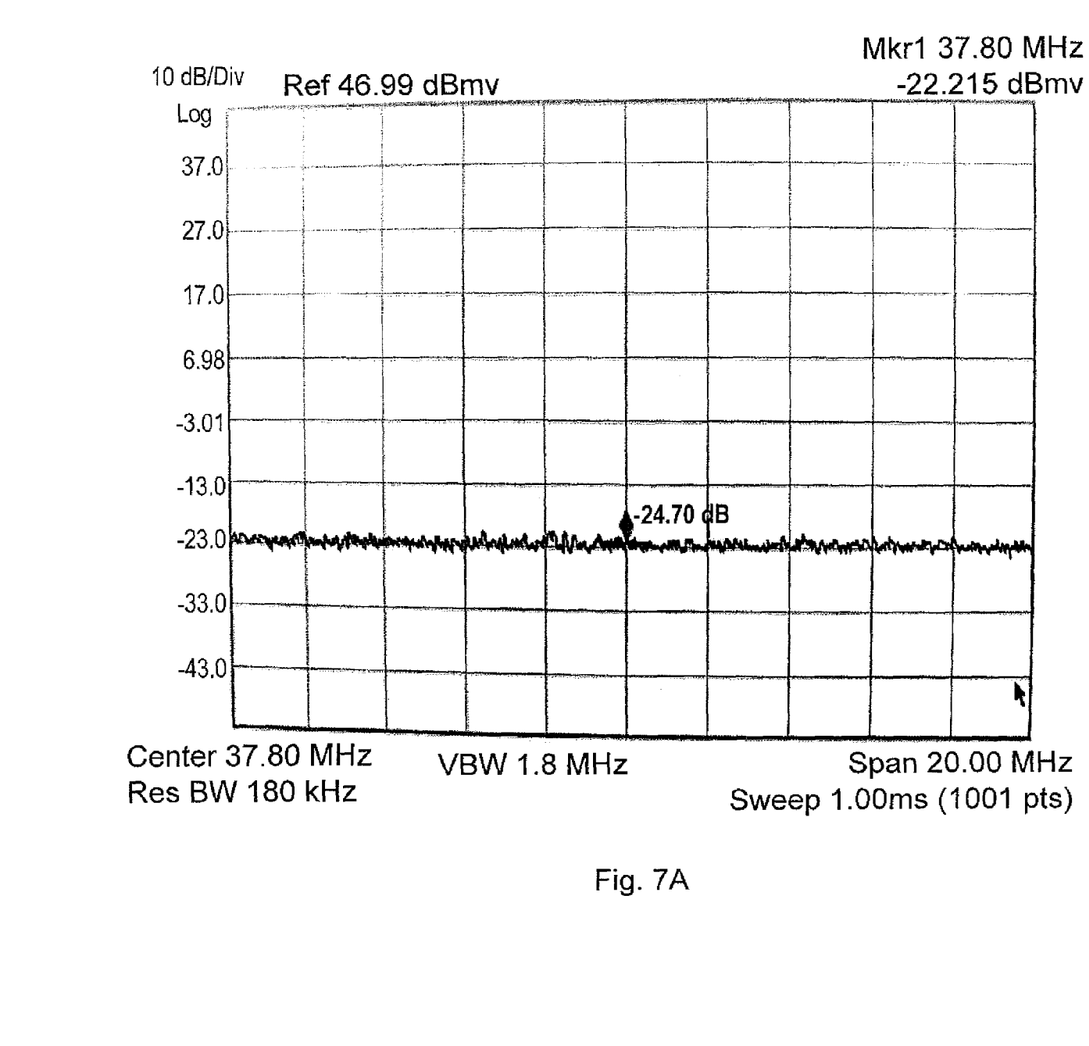
FIGS. 7A-C are laboratory test results presented in graphs which illustrate the noise level of a passive modem as a function of time, the noise level of an active modem as a function of time, and a clean (without noise) output signal as a function of time respectively.
Figure 7B:
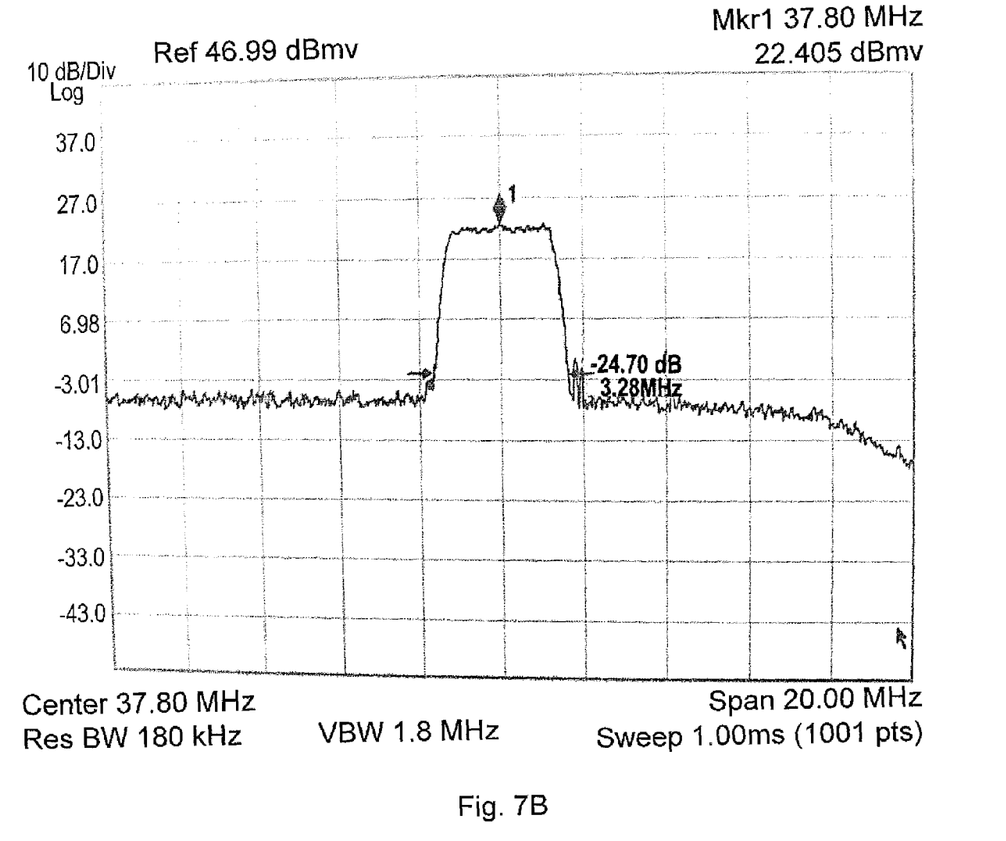
Figure 7C:
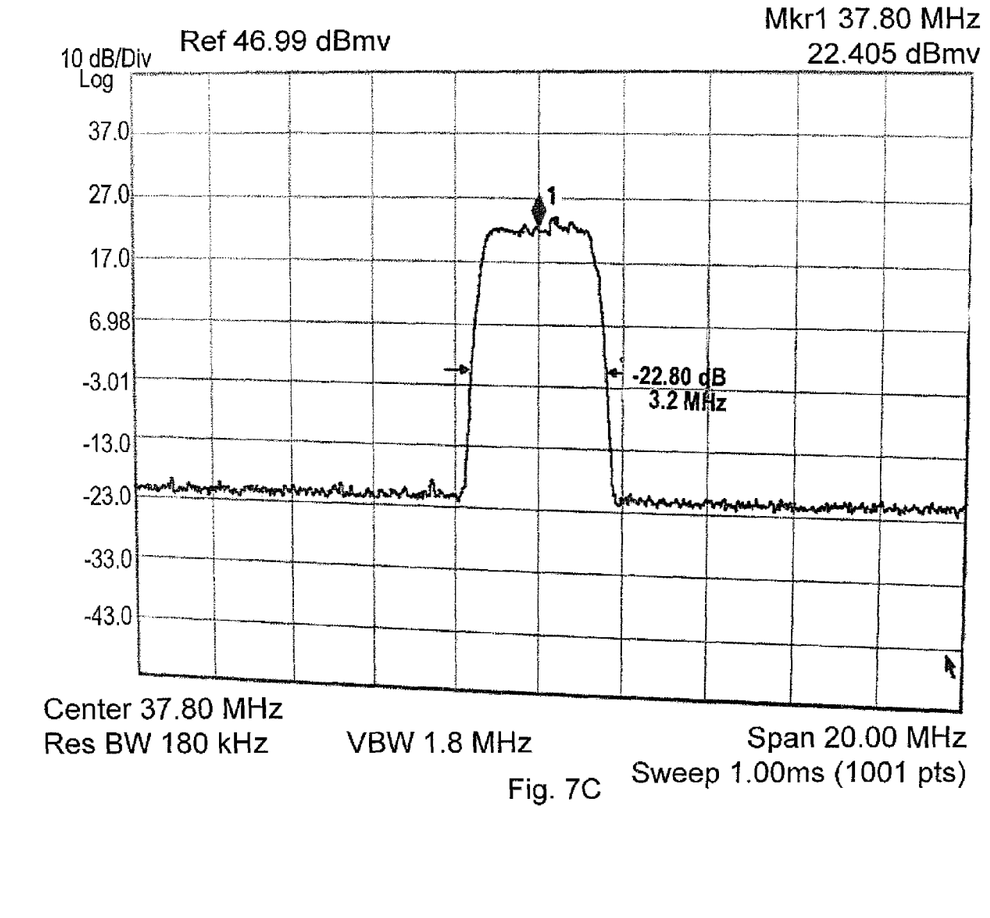

Referring now to FIGS. 7A-C which are laboratory test results presented in graphs which illustrate the noise level of a passive modem (which passes no signal) as a function of time, the noise level of an active modem (which passes a signal) as a function of time, and a clean (without RF noise) output signal as a function of time respectively.

Seen in FIG. 7A, the RF noise level after reduction, i.e., when the modem and the upstream amplifier are passive, is about −23 dB (at this test reduction of 15 dB at noise level).

Seen in FIG. 7B, RF, when no RF noise reduction is available, i.e., when the modem and the upstream amplifier are active, the noise level is about −8 dB.

Thus, based on the above-described FIGS. 7A & 7B, when the modem and the amplifier are passive, noise isolation of about 15 dB is achieved.

Seen in FIG. 7C, demonstrating the signal level of an active modem without additional RF noise from the noise generator.

It should be noted that the amplifiers in either the forward path or and/or the reverse path, in accordance with embodiments of the present invention, may be combined with passive network devices such as splitters (indoor or outdoor type splitter).

It should be further noted that, in accordance with embodiments of the present invention, the upstream path may be an active path as described above as well as a passive path.

The invention claimed is:

1. A bi-directional return signal noise reducing cable TV home amplifier device for installing in the premises of an end user between a cable TV network and a cable TV appliance for reducing noise generated by sources external to and radiated into the cable TV network, said bi-directional return signal noise reducing home amplifier device comprising:
   a first port for connection to said cable TV network;
   a second port for connection to said cable TV appliance;
   a first path connected between said first port and said second port for signal flow from said first port to said second port;
   a second path connected between said second port and said first port for signal flow from said second port to said first port;
   an amplifier that is connected between said second port and said first port and that amplifies signals flowing from said second port to said first port,
   a noise control circuit that connects and disconnects said amplifier to said first port and from said second port; and
   a coupler that couples said signals flowing in said second path to said amplifier and that provides samples of said signals in the second path to said noise control circuit,
   wherein said noise control circuit disconnects said amplifier with said second path when a level of a signal passing through said second path is lower than a predefined signal threshold, and wherein said noise control circuit connects said amplifier with said second path when the level of said signal is greater than said predefined signal threshold,
   wherein said amplifier device provides from 15 dB up to 35 dB ingress isolation.

2. The amplifier device in accordance with claim 1 wherein said noise control circuit comprises an RF switching chip that connects and disconnects said amplifier depending on the level of the signal passing through said second path, wherein said RF switching chip is disposed either before said amplifier or after said amplifier.

3. The amplifier device in accordance with claim 1 achieves about a 90% noise reduction.

4. The amplifier device in accordance with claim 1 wherein said noise control circuit comprises at least one comparator.

5. The amplifier device in accordance with claim 1 is located in a drop side component on a cable TV circuit.

6. A method for controlling noise in an return path of a bi-directional cable TV home amplifier device, the method comprising:
   providing a first port for connection to a cable TV network;
   providing a second port for connection to a cable TV appliance;

providing a first path connected between said first port and said second port for signal flow from said first port to said second port;

providing a second path connected between said second port and said first port for signal flow from said second port to said first port;

providing an amplifier that is connected between said second port and said first port;

amplifying, using the amplifier, signals flowing from said second port to said first port;

using a noise control circuit, connecting and disconnecting said amplifier to said first port and from said second port; and using a coupler, coupling said signals flowing in said second path to said amplifier and providing samples of said signals in the second path to said noise control circuit, wherein said connecting and disconnecting said amplifier to said first port and from said second port includes:

disconnecting said amplifier with said second path when a level of a signal passing through said second path lower than a predefined signal threshold; and connecting said amplifier with said second path when the level of said signal is greater than said predefined signal threshold, wherein said amplifier device provides from 15 dB up to 35 dB ingress isolation.

7. The method in accordance with claim 6, wherein said amplifier is connected by supplying a voltage to said amplifier depending on the level of the signal passing through said second path, and disconnected by blocking said voltage to said amplifier part depending on the level of the signal passing through said second path.

8. The method in accordance with claim 6, further comprises connecting and disconnecting the amplifier depending on the level of the signal passing through the second path with an RF switching chip, wherein said RF switching chip is disposed either before said amplifier or after said amplifier.

9. The method in accordance with claim 6, further comprising implementing said noise control circuit and said second path to a typical cable network CATV splitter/coupler system.

10. The method in accordance with claim 6, achieves about 90% noise reduction.

11. The method in accordance with claim 6, wherein said noise control circuit comprises at least one comparator.

12. The method in accordance with claim 6, wherein said amplifier is located in a drop side component on a cable TV circuit.

13. The method in accordance with claim 6, wherein said amplifier is disposed on a cable network.

\* \* \* \* \*

UNITED STATES PATENT AND TRADEMARK OFFICE
CERTIFICATE OF CORRECTION

PATENT NO. : 8,850,505 B2
APPLICATION NO. : 13/144210
DATED : September 30, 2014
INVENTOR(S) : David Zilberberg It is certified that error appears in the above-identified patent and that said Letters Patent is hereby corrected as shown below:

In the Specification

Column 7, Line 55, "couple" should be --coupler--

In the Claims

Column 8, Line 35, Claim 1; "port," should be --port;--

Column 9, Line 21, Claim 6; before "lower" insert --is--

Signed and Sealed this
Thirty-first Day of March, 2015

Michelle K. Lee
*Director of the United States Patent and Trademark Office*